June 12, 1945.　　　R. B. POGUE　　　2,378,100
BRAKING APPARATUS
Filed April 2, 1943　　　3 Sheets-Sheet 1
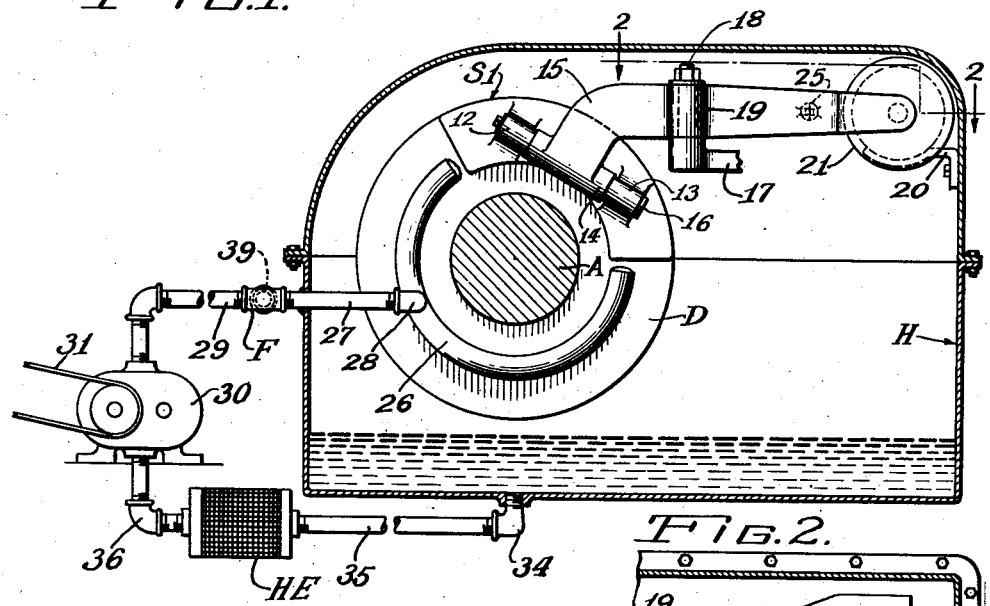
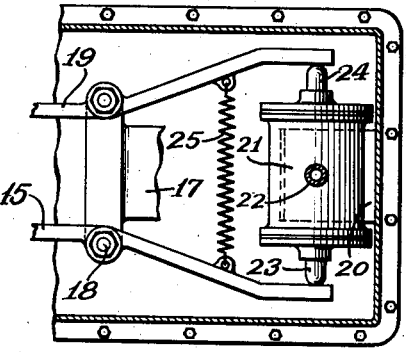
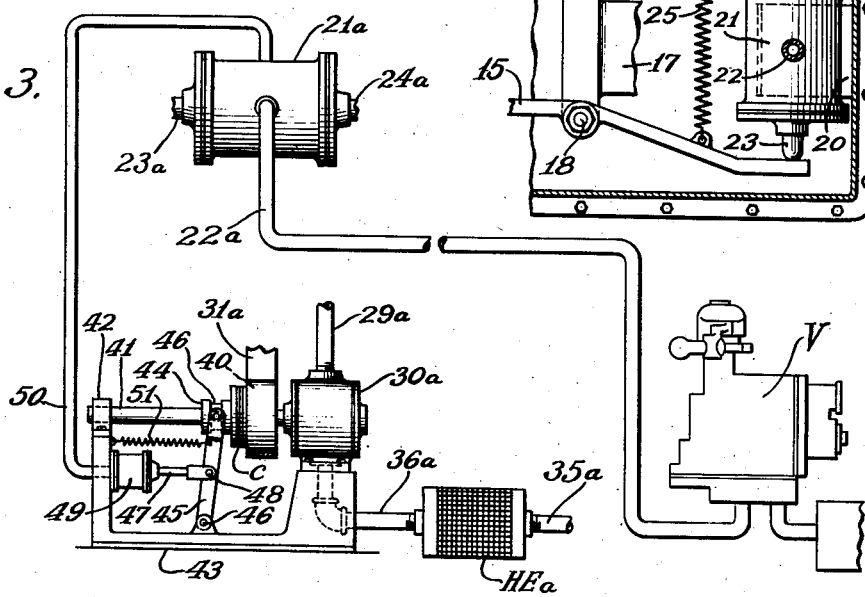
Inventor:
Robert B. Pogue
By Wallace and Cannon
Attorneys

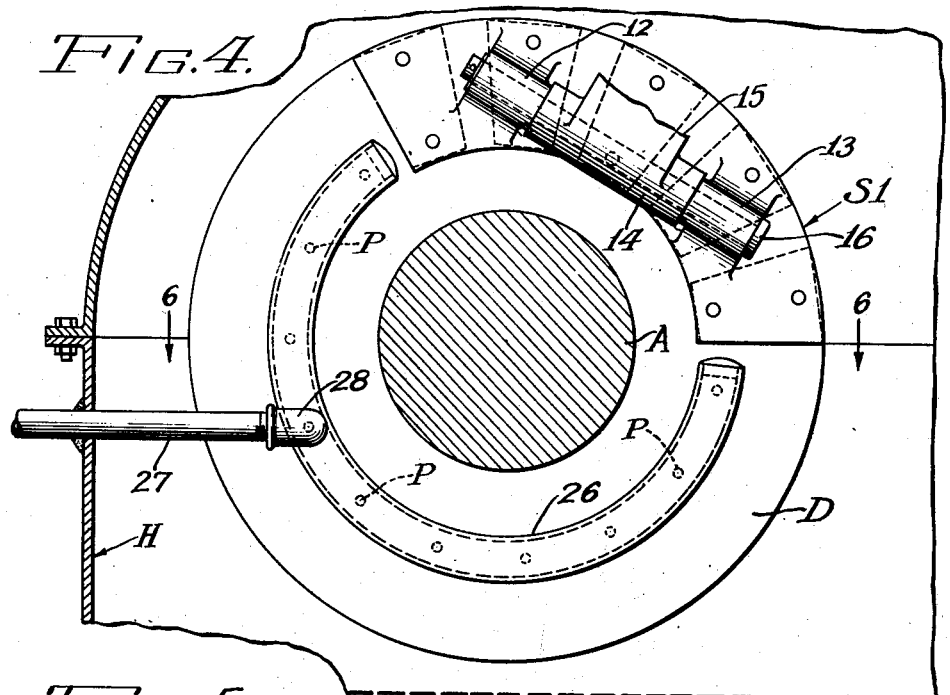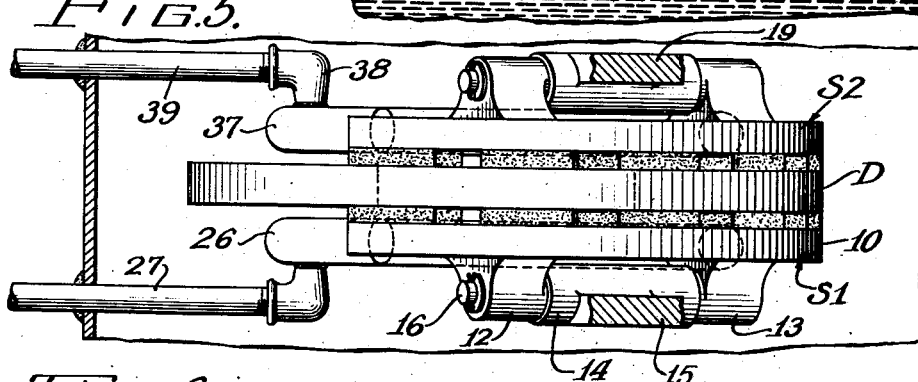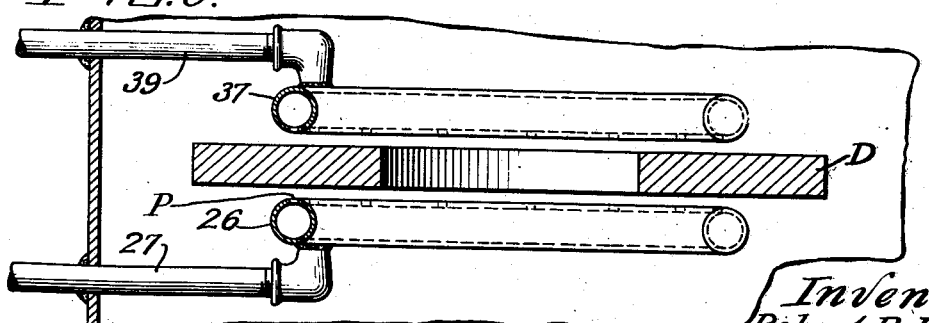

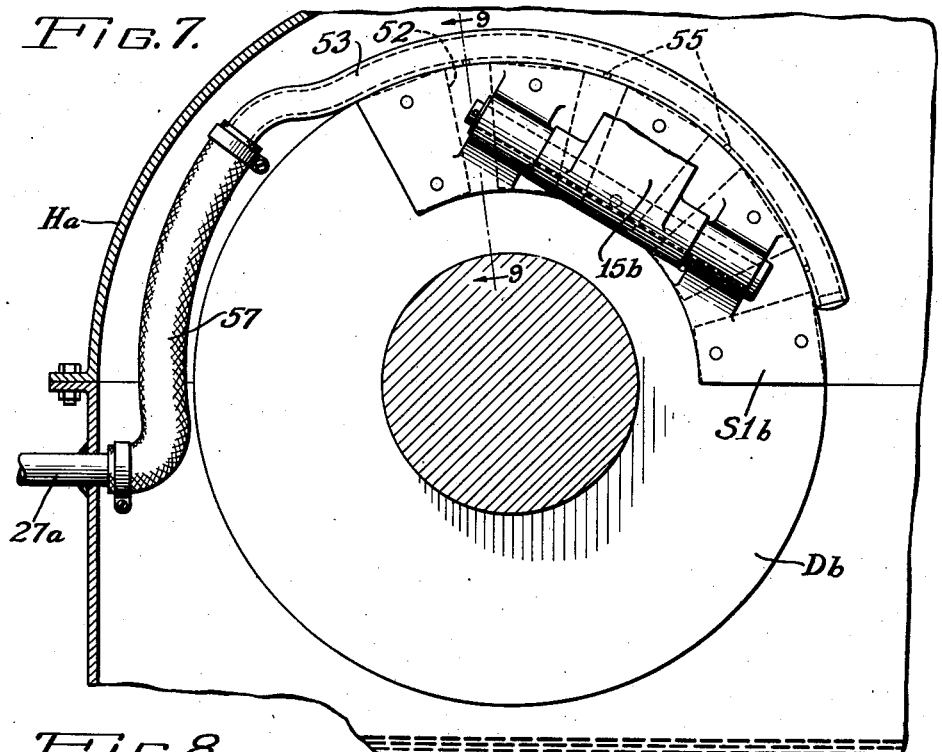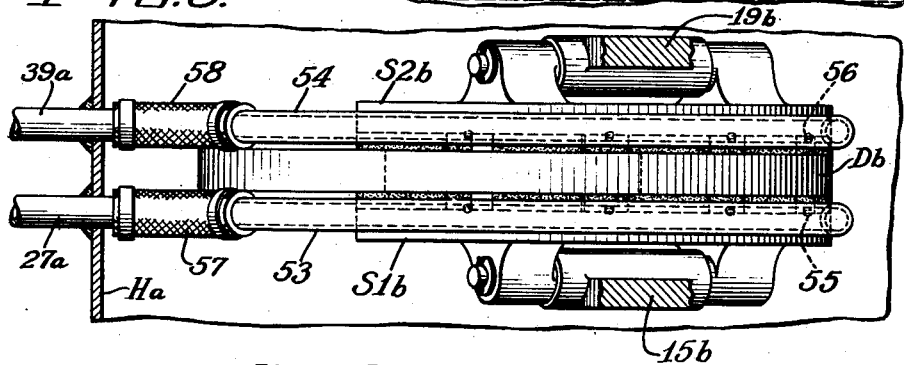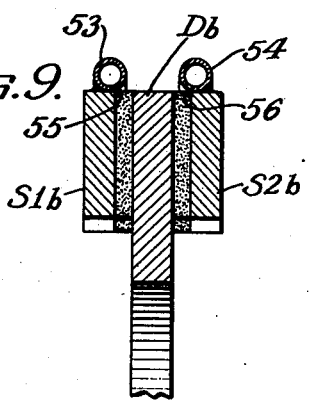

Patented June 12, 1945

2,378,100

UNITED STATES PATENT OFFICE 2,378,100

BRAKING APPARATUS

Robert B. Pogue, Orange, N. J., assignor to American Brake Shoe Company, a corporation of Delaware Application April 2, 1943, Serial No. 481,535

2 Claims. (Cl. 188—264)

This invention relates to braking apparatus of the character employed in railway equipment and other relatively heavy vehicles capable of comparatively rapid movement.

In those instances where the braking apparatus employed on a vehicle of the aforesaid character is rendered effective to decelerate the vehicle, particularly when the vehicle is moving rapidly, it is necessary to dissipate appreciable energy in the form of heat and in such circumstances it is desirable that the heat be so dispelled as to prevent a detrimental temperature rise in the various elements of the braking apparatus and so to do in a novel and effective manner is the primary object of the present invention.

In instances where the braking apparatus on a vehicle of the aforesaid character has been what is commonly referred to as a disc brake apparatus, in which one or more braking elements is or are applied to one or both faces of the rotating disc, it has been proposed heretofore to circulate a cooling fluid through the disc as by incorporating an air circulating means between the faces of the disc to which the braking elements are applied when a deceleration is to be effected. In such prior arrangements the cooling fluid has been circulated over a part or parts of the disc that is or are spaced inwardly from the surface or surfaces thereof to which the braking element or elements is or are applied and on which surfaces therefor the tendency toward a temperature rise is greatest. In such arrangements, however, it has been observed that the temperature of the cooling fluid ofttimes does not rise until well after a deceleration has been initiated and some times not until well after the deceleration has been completed. Such a lag in temperature rise of the cooling fluid accrues because the heat must flow through the disc from the surface thereof, to which the braking element or shoe is applied, to the portion thereof inwardly of such surface and over which cooling fluid is caused to flow. Therefore, in such circumstances very appreciable temperature differences are set up in the disc, especially during the initial stages of a deceleration, for the surface or surfaces to which the shoe or shoes is or are applied is or are heated to a relatively high temperature while those portions of the disc over which the cooling fluid is caused to flow remain comparatively cool, and heat checking or even fracture of the disc in such circumstances is not at all uncommon.

Inasmuch as greatest heating effect on the rotatable element to be decelerated occurs on or immediately beneath a surface or surfaces thereof to which the braking element or elements is or are applied, it is desirable that such portions of the rotating element be directly subjected to a cooling effect for so to do avoids setting up detrimental temperature differences in the element such as may give rise to heat checking, fracture or other injury thereto and to enable a cooling fluid to be directly supplied to such surface or surfaces of a rotating element that is to be decelerated is among the primary objects of the present invention.

In most instances where a braking element or shoe is applied to the axially inner or axially outer surface of a rotating disc to effect deceleration thereof, such an element or shoe is applied to but a part of such axially inner or axially outer face, wherefore an appreciable portion of such a face is exposed beyond the ends of the element or shoe and it is therefore yet another important object of my invention to supply a cooling fluid to those portions of an axially inner or axially outer face of a disc that are exposed beyond the ends of a braking element applied to such a face or surface.

In many instances the element or shoe which is applied to the axially inner or axially outer face of a disc to be decelerated includes a plurality of spaced apart friction members and it is therefore yet another object of this invention to enable a cooling fluid to be supplied to the surface to which such friction members are to be applied at positions adjacent to or intermediate of such friction members and another object related to the foregoing is to arrange the member adapted to supply such a cooling fluid to the surface of the element to be decelerated on the part carrying the friction member or members to be applied to such a surface to effect deceleration of the element embodying the surface.

Yet other objects are to supply a cooling fluid to either or both the axially inner or axially outer face or faces of a disc or the like and which surfaces a braking element or elements is or are applied to effect deceleration of the vehicle or the like with which the disc is caused to move so long as the vehicle or the like is in motion; to so supply a cooling fluid to such operative surfaces of a disc or the like that the cooling fluid may be collected after having been supplied to such a surface; and to enable the cooling fluid to be recirculated to the disc, and an object ancillary to the foregoing is to enable the cooling fluid to be cooled after flowing over the disc and prior to being resupplied thereto.

Further objects are in some circumstances to control the supply of a cooling fluid to surfaces of a disc or the like in such a way that the cooling fluid will only be supplied thereto during the time deceleration of the disc is being effected and another object ancillary to the foregoing is to control the supply of a cooling fluid to the surface of a disc by the means effective to control the application of a braking element or elements to such surfaces.

Other and further objects of the present invention will be apparent from the following description and claims and are illustrated in the accompanying drawings which, by way of illustration, show preferred embodiments and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings,

Fig. 1 is a side view of a braking apparatus embodying my invention and in which the housing enclosing the braking apparatus is shown in vertical section and also in which a part of the novel cooling system of my invention is schematically illustrated;

Fig. 2 is a plan view taken substantially on the line 2—2 in Fig. 1;

Fig. 3 is a schematic view illustrating a modified form of a part of my novel cooling apparatus;

Fig. 4 is a fragmentary view similar to Fig. 1 and showing a part of the apparatus illustrated therein drawn to a larger scale;

Fig. 5 is a plan view of the apparatus as shown in Fig. 4;

Fig. 6 is a horizontal sectional view taken substantially on the line 6—6 on Fig. 4;

Fig. 7 is a view similar to Fig. 4 showing a modified form of my invention;

Fig. 8 is a plan view of the apparatus shown in Fig. 7; and

Fig. 9 is a sectional detail view taken substantially on the line 9—9 on Fig. 7.

The form of braking apparatus shown in Figs. 1, 2, 4, 5 and 6 includes a disc D that is secured to an axle A of a vehicle in any suitable manner understood in the art. Shoes S1 and S2, desirably of segmental configuration, each includes a metallic supporting plate as 10 having spaced apart lugs as 12 and 13 on the rear face thereof between which a bearing as 14 carried at the one end of a lever 15 is disposed, a suitable pintle 16 being passed through the lugs as 12 and 13 and the bearing 14 to thereby pivotally connect the shoe as S1 to the lever 15. A bracket as 17, Fig. 1, suitably secured to the frame of the vehicle that includes the axle A, provides a support for a pintle 18 is passed through a bearing 19 on the lever 15 to thereby afford a fulcrum for the lever 15, the arrangement being such that the shoe S1 is supported from the bracket 17 by the arm or lever 15 in position to engage a portion of one of the axial faces of the disc D. Another lever 19 is supported on the bracket 17 in the same manner as that in which the arm or lever 15 is supported from this bracket and this lever 19 supports the shoe S2 in position to engage the face of the disc D opposite that engageable by the shoe S1.

Another bracket 20 is supported from the frame of the vehicle in a suitable manner and this bracket in turn supports a double acting cylinder 21 to which air under pressure is to be supplied from a suitable source through a supply pipe 22. Desirably the flow of air under pressure through the pipe 22 will be controlled by conventional control means for braking apparatus. When air under pressure is supplied through the pipe 22 to the cylinders 21 the plungers 23 and 24 at opposite ends of the cylinder are forced outwardly to force the adjacent ends of the levers 15 and 19 outwardly, these ends of these levers being held in engagement with these plungers under the influence of the spring 25 is effected thereon. When the plungers 23 and 24 force the aforesaid ends of the levers 15 and 19, the shoes S1 and S2 are forced into engagement with the disc D to thereby effect deceleration thereof and also the axle A and vehicle in which this axle is included.

It will be understood that my invention is not limited to a braking arrangement such as that described hereinabove for resort may be had to any conventional means for applying shoes or braking elements as S1 and S2 respectively to axially inner and axially outer faces of a disc or other rotating element as D without departing from the ambit of my invention.

As best shown in Figs. 1 and 4, the shoes as S1 are sized so as to be engageable with but a part of an axial face of the disc as D and in the present instance the arrangement is such that appreciably more than 180° of surface of the disc is exposed beyond the opposite ends of a shoe as S1 and in accordance with the instant form of my invention I supply a cooling fluid to at least a portion of the surface of the disc D that is thus exposed beyond opposite ends of a shoe as S1. Thus, in accordance with my invention an arcuate pipe 26 is arranged in juxtaposition to the face of the disc D to which the shoe S1 is to be applied and the opposite closed ends of this pipe 26 are respectively arranged adjacent to opposite ends of the shoe S1. A plurality of spaced apart openings as P are provided in the pipe 26 to be extended toward the adjacent ends of the discs D. In the present instance an elbow 28 is fitted into the pipe 26 intermediate the ends thereof and a pipe 27 leads from the elbow 28 through a wall of the housing H to be supported by this wall so that the pipe 26 is supported by the pipe 27 and the elbow 28 in aforesaid relation with the disc D.

As best shown in Fig. 1 the disc D, the cylinder 21 and the levers 15 and 19 and associated parts are supported within the housing H which is arranged to enclose these parts, and the lower portion of this housing H affords a sump in which a liquid coolant supplied to the pipe 26 may collect after flowing over the face of the disc D adjacent to which the pipe 26 is arranged, the housing H being supported from the frame of the vehicle of which the axle as A is a part. In the present instance a liquid coolant is supplied to the pipe 27 and thence through the elbow 28 to the pipe 26 from a pipe 29 that is connected to the pipe 27 through a T-fitting F. The pipe 29 leads to the outlet of a pump 30 which in the present instance is driven by a belt 31 from a suitable source of power described more fully hereinafter. Moreover, in the present instance, an elbow 34 leads from the bottom of the housing H to a pipe 35 which is directed to a suitable heat exchanger HE, which may be of the type through which a cooling fluid such as air may flow or, if desired, this heat exchanger may be of such nature that a cooling liquid may be circulated therethrough. A pipe 36 leads from the heat exchanger HE to the inlet of the pump 30.

Another pipe 37 similar to the pipe 26 is associated with the face of the disc opposite that in which the pipe 26 is associated and in the same manner as that in which the pipe 26 is associated with an adjacent face of the disc. An elbow 38 is connected to the pipe 37 and a pipe 39 is connected thereto which in turn is directed to the T-fitting F.

The source of power to which the belt 31 is directed may be related to the axle A so as to only be operative when the axle A is in operation or, if desired, the source of power may be of such nature as to be in constant operation irrespective of whether or not the axle A is in operation. In any event, the pump 30 is operated in all instances when a liquid coolant is to be supplied to surfaces of the disc D and particularly when the shoes as S1 and S2 are to be applied to the disc D to effect deceleration thereof. Thus, when shoes as S1 and S2 are applied to the axial faces of the disc D to effect deceleration thereof a liquid coolant is discharged onto the surfaces of this disc to which the shoes are thus applied. In the present instance the liquid coolant flows from the pump 30 through the pipe 29 to the fitting F and thence through the pipes 27 and 39 and elbows 26 and 38 into the pipes 26 and 37 and then out through openings as 27 directly onto the face of the disc to which the shoes are applied. Hence, the liquid coolant is supplied directly to the surfaces to which the shoes are applied wherefore the coolant is directly effective to cool these surfaces of the disc whereby an objectionable temperature on and immediately beneath these surfaces is avoided.

After flowing onto the surface of the disc as D the liquid coolant, in the present instance, collects in the bottom of the housing H from whence it may flow through the elbow 34, pipe 35, and heat exchanger HE, when such a heat exchanger is provided, and thence through the pipe 36 back to the pump 30 to be recirculated to the pipes 26 and 37 to be again dispersed onto the surfaces of the disc D. I have found that by supplying a liquid coolant which, for example, may be a suitable oil, directly to the surface of a disc as D to which shoes as S1 and S2 are applied, I am able to prevent an objectionable temperature rise in those portions of the disc subjected to the greatest heat and I am, therefore, able to avoid heat checking or other injury of the disc in the course of a deceleration effected by the application of shoes to the axially inner and axially outer faces of the disc.

In some instances it may be desirable to supply a liquid coolant to a disc as D in the above described manner only in those instances when a deceleration is in progress and in order that this may be realized resort may be had to an arrangement such as that shown in Fig. 3. Thus in Fig. 3 I have shown a brake cylinder 21a that is similar to the cylinder 21 which, as explained hereinabove, is effective to apply the shoes as S1 and S2 to the opposite faces of the disc as D. Air under pressure is supplied to the cylinder 21a through a pipe as 22a that desirably leads to a source of air under pressure, the flow of air under pressure through the pipe 22a being controlled by a conventional brake control means. A pump as 30a similar to the pump 30 is also utilized and in this instance a pipe as 36a leads from a heat exchanger as HEa to the inlet of the pump 30a, the heat exchanger HEa being arranged in the system in the same manner as that in which the heat exchanger HE is arranged, as explained hereinabove. Moreover, an outlet pipe as 29a from the pump 30a is directed to a fitting as F so that liquid coolant may be supplied under pressure to pipes as 26 and 37 in the manner explained hereinabove from the pump 30a.

The belt 31a for operating the pump 30a is directed to a source of power which will be operative at least when a deceleration of a disc as D is to be effected. The belt 31a is passed about a pulley 40 that is rotatably mounted on the drive shaft 41 of the pump 30a, this drive shaft being extended from the pump and being journaled in a bearing 42 provided on a supporting frame 43 secured to the frame of the vehicle, the frame 43 in the present instance also affording a support for the pump 30a. A collar 44 is keyed or otherwise slidably but non-rotatably connected to the drive shaft 41 of the pump 30a and a clutch disc C is interposed between the pulley 40 and the collar 44. The forked end of a rocker 45 is engaged in a groove 46 provided in the periphery of the collar 44 and this rocker is pivotally connected to the frame 43 as indicated at 46. A plunger 47 is pivotally connected to the arm 45, as indicated at 48, and leads from a cylinder as 49. A pipe as 50 leads from the cylinder 49 to the brake cylinder 21a.

Hence when air under pressure is admitted through the pipe 22a to the cylinder 21a to effect deceleration of the disc as D in the manner explained hereinabove, air under pressure is also admitted through the pipe 50 to the cylinder 49, whereupon the plunger 47 actuates the lever 45 to thereby, through the clutch disc C, connect the collar 44 to the pulley 40 and thereupon the pump 30a is set in operation. This causes a liquid coolant to be discharged on the surface of the disc D in the manner explained hereinabove and such coolant will be so supplied to the surfaces of the disc so long as air under pressure is supplied to the brake cylinder 21a and the cylinder 50 or, in other words, so long as a deceleration is in progress. When, however, the supply of air under pressure to the cylinder 21a is interrupted, the spring 51 is effective on the arm 45 to disengage the collar 44 from the clutch disc C and thereupon operation of the pump 30a is interrupted.

In the form of the invention thus far described a coolant is supplied to those portions of the faces of a disc as D other than those engaged by the frictional faces of shoes as S1 and S2. However, shoes as S1 and S2 often have a plurality of blocks of friction material mounted on the operative faces thereof as best shown, for example, in Figs. 7 and 8, where the shoes as S1b and S2b are shown. These shoes have a plurality of blocks as 52 mounted on the operative faces thereof in spaced relation one with the other. It will be understood that the shoes as S1b and S2b may be, for example, respectively supported for engagement with opposite faces of a disc as Db by levers as 15b and 19b which correspond to the levers 15 and 19 described hereinabove.

In an instance, however, where spaced apart blocks of friction material as 52 are provided on the operative faces of shoes as S1b and S2b, pipes as 53 and 54 may be secured to the edges of the shoes as S1b and S2b arranged adjacent to the periphery of the disc as Db and these pipes are respectively provided with outlet openings as 55 and 56. The openings 55 and 56 are respectively provided in the pipes 53 and 54 to be aligned with the spaces between the blocks of friction material 52 respectively provided on the shoes as S1b and S2b and desirably these openings are faced toward the adjacent face of the disc as Db so that a liquid coolant supplied to the pipes 53 and 54 will be discharged directly onto the faces of the disc Db intermediate the blocks of friction material respectively provided on the shoes as S1b and S2b.

The braking apparatus shown in Figs. 7, 8 and 9 is adapted to be enclosed in a housing Ha which corresponds to the housing H and pipes as 27a and 39a, respectively corresponding to the pipes 27 and 39, described hereinabove, are led into the housing Ha. A flexible tube as 57 leads from the pipe 27a to the inlet end of the pipe 53, the opposite end of this pipe being closed and likewise a flexible tube 58 leads from the pipe 39a to the inlet end of the pipe 34, the opposite end of this pipe also being closed.

When a liquid coolant is supplied to the pipes 27a and 39a in any of the ways described hereinabove, this liquid coolant flows to the pipes 53 and 54 to be discharged through the openings 55 and 56 onto the adjacent faces of the disc as Db, wherefore, since this will cause a liquid coolant to be supplied to the faces of the disc D immediately adjacent to the positions on these faces whereat the blocks of friction material as 52 are being applied thereto, effective cooling of the faces of the disc as Db is brought about promptly because the liquid coolant is supplied to faces of the disc immediately adjacent to the places whereat these faces of the disc are subjected to the greatest heating effect.

While the particular manner in which the flow of air to cylinders as 21 and 21a and 49 is effected forms no particular part of my invention I have shown in Fig. 3 a conventional control means which, in this instance, is a manually operated valve V which may be, for example, of the character disclosed in United States Letters Patent to Bush No. 2,068,370, patented January 19, 1937, or, for example, that disclosed in United States Letters Patent to Ewing and Bush No. 2,042,112, patented May 26, 1936. Moreover, it will be understood that means other than pneumatic means might be utilized for effecting application of the braking elements to the member to be decelerated without departing from the purview of my invention.

Furthermore, it is to be understood that the arrangement illustrated in Fig. 3 may be utilized either as described hereinabove in association with an arrangement such as that illustrated in Fig. 1 or in association with an arrangement such as that shown in Fig. 7 inasmuch as in many instances it will be desirable to control the flow of a cooling fluid to the surface or surfaces of a member to be decelerated in such a manner that the fluid will only be supplied to such surfaces during the time a deceleration is in progress. However, in some instances it may be desirable to continuously supply a cooling fluid to surfaces such as the aforesaid and in this event resort may be had, for example, to an arrangement such as that shown in Fig. 1 and in such an instance the pump as 30 would be continuously operated.

Yet, further, I have illustrated my invention in association with a braking arrangement embodying a disc including two substantially parallel surfaces which are desirably arranged in a vertical plane, this being a more or less conventional arrangement in the art. In this regard, however, it is to be understood that my invention is not limited to utilization in a disc brake arrangement for my invention may be used in any instance where a braking surface is afforded that is of such nature that a cooling fluid supplied thereto may flow thereover and therefrom. However, I believe that the advantages of my invention can best be realized in those instances where the member to be decelerated includes at least one surface that is arranged in a substantially vertical plane, for in such circumstances flow of the cooling fluid over and from the surface may best be realized so as to thereby effect efficient dissipation of heat that is generated in a deceleration effected by the application of at least one braking element to such a surface.

It will be manifest from the foregoing description that I have provided an arrangement whereby a liquid coolant may be directly applied to the face or faces of an element that is decelerated by the application of a braking element or elements to the surfaces to which the liquid coolant is supplied and this results in so cooling these surfaces of the rotating element that an objectionable temperature rise on these surfaces and in the portions immediately below these surfaces is prevented, whereby heat checking, cracking or other injury to the element is prevented.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a braking apparatus including a member to be decelerated affording a braking surface, a braking element of length less than one half the length of said braking surface and engageable therewith to effect deceleration of said member, a coolant discharge member extended along said braking surface in spaced relation therewith between opposite ends of said braking element and from which a coolant may be discharged onto the adjacent portion of said braking surface to thereby dissipate heat generated as an incident to the deceleration of the member effected by the application of said braking element to said braking surface.

2. In a braking apparatus, a disc affording an at least substantially vertically disposed braking surface, a braking element of a length less than one half the length of said braking surface and engageable therewith to effect deceleration of said disc, a coolant discharge member disposed adjacent to said braking surface and extended between opposite ends of said braking element and having a plurality of openings therein directed toward said braking surface and from which coolant may be sprayed onto said surface to afford a film of coolant beneath said braking element and to flow over said braking surface and drain from the lower portion thereof and thereby effect dissipation of heat generated as an incident to the deceleration of said disc effected by the application of the braking member to the braking surface.

ROBERT B. POGUE.